United States Patent
Wathne et al.

(10) Patent No.: US 6,623,776 B1
(45) Date of Patent: Sep. 23, 2003

(54) COMPOSITE, PARTICULATE FEED FOR FRY OR FOR LARVAE OF OTHER MARINE ORGANISMS AND METHOD OF MANUFACTURING THE STARTING FEED

(75) Inventors: Einar Wathne, Sandnes (NO); Jan Morten Homme, Risør (NO)

(73) Assignee: Nor Aqua Innovation AS, Dirdal (NO)

( * ) Notice: Subject to any disclaimer, the term of this patent is extended or adjusted under 35 U.S.C. 154(b) by 0 days.

(21) Appl. No.: 09/830,505

(22) PCT Filed: Oct. 25, 1999

(86) PCT No.: PCT/NO99/00325

§ 371 (c)(1),
(2), (4) Date: Apr. 26, 2001

(87) PCT Pub. No.: WO00/27218

PCT Pub. Date: May 18, 2000

(30) Foreign Application Priority Data

Oct. 28, 1998 (NO) .......................................... 19985005

(51) Int. Cl.$^7$ .............................. A23K 1/00; A23K 1/16
(52) U.S. Cl. ........................ 426/385; 426/573; 426/662; 426/805
(58) Field of Search ................................. 426/385, 662, 426/805, 573

(56) References Cited

U.S. PATENT DOCUMENTS 5,698,246 A * 12/1997 Villamar ...................... 426/54

FOREIGN PATENT DOCUMENTS

| EP | 158 441 | 10/1985 |
|---|---|---|
| EP | 0158441 | * 10/1985 |

OTHER PUBLICATIONS

"Effect of a dietary phospholipid supplementation on growth and fatty acid composition of European sea base (*Dicentrarchus labrax* L.) and turbot (*Scophthalmus maximus* L.) juveniles from weaning onwards", I. Geurden et al., Fish Physiology and Biochemistry, vol. 6, 1997, p. 259–p. 272.

"Essentiality of dietary phospholipids for carp (Cyprinus carpio L.) larvae", I. Geurden et al., Aquaculture, vol. 131, 1995, p. 303–p. 314.

File WPI, Derwent accession No. 1990–026600, Riken Vitamin Co.: "Mixed feed for shell fish in early stage—contains liq. roe and protein–like defatted milk, squid meal or krill meal, vitamin(s) amino acids, etc.", & JP, A,2304852, 19891208, DW199004.

File WPI, Derwent accession No. 1983–40603K, Riken Vitamin Co.: "Feed for flat–fish Fry—comprising artificial compound feed and phospholipid, e.g. soybean lecithin"; & JP,A,58047447, 19830319, DW198317.

File WPI, Derwent accession No. 1993–080319, Takeda Chem Ind Ltd: "Water–soluble vitamin compsn. used as aquatic animal food additive—contains emulsifying agent, emulsion stabiliser and pref. ascorbic acid as water–soluble vitamin"; & JP,A, 5025042, 19930202, DW199310.

"Experimental evidence of chemokinesis in newly hatched cod larvae (*Gadus morhua* L.)", K. B. D(jving et al., Marine Biology (1994) 120:351–358.

"The Production and Evaluation of Contrast–Carrying Liposomes Made with an Automatic High–Pressure System", Kenneth T. Cheng et al., Investative Radiolgoy, Jan. 1987, vol. 22, vol. 1, pp. 47–51.

"Two noval Artemia enrichment diets containing polar lipid", L.A. McEvoy et al., Elsevier Science B.V., Aquaculture 144 (1996), p. 339–352.

H. Dabrowska, C. Grudniewski, K, Dabrowski, (1979): Artificial Diets for Common Carp: Effect of the Addition of Enzyme Extracts, Prog.Fish–Cult., 41: 196–200.

K Dabrowski, (1984): The Feeding of Fish Larvae: Present <<State of the Art>> and Perspectives, Reprod. Nutr. Develop. 24:807–833.

H.J. Fyhn, (1989): First Feeding of Marine Fish Larvae: Are Free Amino Acids the Source of Energy? Aquaculture, 80: 111–120.

K. Hjelmeland, I. Huse et al, (1984). Trypsin and trypsinogen as indices of growth and survival potential of cod (*Gadus morhua* L.) larvae. In Dahl, E. et al (eds.), The propagation of code *Gadus morhua* L. Fl(jdevigen rapportser. 1. pp 189–202.

M. Lauff, R. Hofer, R. (1984): Proteolytic enzymes in fish development and the importance of dietary enzymes. Aquaculture, 37: 335–346.

(List continued on next page.)

*Primary Examiner*—Chhaya D. Sayala
(74) *Attorney, Agent, or Firm*—Andrus, Sceales, Starke & Sawall, LLP (57) ABSTRACT

There has been explained a composite, particulate feed for fish larvae or fry, and larvae of other aquatic organisms. This dry feed, so-called formulated feed, shall be of such a high quality and condition and otherwise exhibit such properties as to make it suitable for replacing live feed (for example Artemia Salinas), which is very expensive and which may be hard to obtain, at least periodically, and which has a generally very low percentage of hatching (Artemia Salinas) some years. To this end a feed according to the invention excels in that the feed particles consist of a matrix containing water-insoluble nutrients, phospholipids/biomembranes being embedded in said particles, which biomembranes contain fat-soluble components and pack water-soluble nutrients. Also, there has been explained a method of manufacturing such feed, whereby a matrix material which contains water-insoluble nutrients, phospholipids/biomembranes containing fat-soluble and water-soluble nutrients, further nutrients and water is mixed together, comminuted in a nozzle or similar and then cross-linked in a suitable solution.

12 Claims, 8 Drawing Sheets

OTHER PUBLICATIONS

E. Moksness, J. Gjøsøther, A. Reinhert, I.S. Fjallstein, (1989): Start–feeding and On–Growing of Wolffish (*Anarhichas lupus*) in the Laboratory. Aquaculture, 77: 221–228.

K.E. Naas, T. Næss, T. Harboe, (1992): Enhanced first feeding of halibut larvae (*Hippoglossus hippoglossus L.*) in green water. Aquaculture, 105: 143–156.

T. Næss, M. Germain–Henry, K.E. Naas, (1995): First feeding of Atlantic halibut (*Hippoglossus hippoglossus*) using different combinations of Artemia and wild zooplankton. Aquaculture, 130: 235–250.

B.H. Pedersen, I. Ugelstad, K. Hjelmeland, (1990): Effects of a transitory, low food supply in the early life of larval herring (*Clupea harengus*) on mortality, growth and digestive capacity. Mar.Biol., 107:61–66.

J. Person Le Ruyet, J.C. Alexandre, L. Thebaud, C. Mugnier (1993): Marine Fish Larvae Feeding: Formulated Diets or Live Prey? J. World Aquac. Soc. 24.

I. Rønnestad, H.J. Fyhn (1993): Metabolic Aspects of Free Amino Acids in Developing Marine Fish Eggs and Larvae. Rev. Fish. Sci., 1: 239–259.

I. Rønnestad, H.J. Fyhn, K. Gravningen (1992): The importance of free amino acids to the energy metabolism of eggs and larvae of turbot (*Scophthalmus maximus*). Mar. Biol. 114: 517–525.

I. Rønnestad, W.M. Koven, A. Tandler, M. Harel, H.J. Fyhn (1994): Energy metabolism during development of eggs and larvae of gilthead sea bream (*Sparus aurata*). Mar. Biol., 120: 187–196.

J. Sargent, R.J. Henderson, D.R. Tocher (1989): The Lipids. In:Halver. J.E. (Ed.), Fish Nutrition. Academic Press Inc., pp. 154–209.

A. Tandler, S. Kolkovsky (1991): Rates of ingestion and digestibility as limiting factors in the successful use of microdiets in *Sparus aurata* larval rearing. European Aquac. Soc., 15: 169–171.

E. Urban–Jezierska, E. Kamler, B. Barska (1984): Dry Matter and Nitrogen Compounds Leached from Six Carp Starters. Pol. Arch. Hydrobiol. 31: 119–134.

T. van der Meeren, J. Klungsøyr, S. Wilhelmsen, P.G. Kvenseth (1993): Fatty acid composition of unfed cod larvae (*Gadus morhua L*). and cod larvae feeding on natural plankton in large enclosures. J. World Aquac. Soc. 24: 167–185.

T. van der Meeren, T. Næss (1993): How does cod (*Gadus morhua*) cope with variability in feeding conditions during early larval stages? Mar. Biol. 116: 637–647.

J.A. Verreth, E. Torreele, E. Spazier, A. van der Sluiszen, J.H.W.M. Rombout, R. Booms (1992): The Development of a Functional Digestive System in the African Catfish *Clarias gariepinus* (Burchell). J. World Aquac. Soc. 23: 286–298.

T. Watanabe, V. Kiron (1994): Prospects in larval fish dietetics. Aquaculture, 124: 223–251.

\* cited by examiner

COMPOSITE, PARTICULATE FEED FOR FRY OR FOR LARVAE OF OTHER MARINE ORGANISMS AND METHOD OF MANUFACTURING THE STARTING FEED

CROSS REFERENCE TO RELATED APPLICATION

The present application is the U.S national stage application of International Application PCT/N099/00325, filed Oct. 25, 1999, which international application was published on May 18, 2000 as International Publication WO 00/27218 in the English language. The International Application claims priority of Norwegian Patent Application 19985005, filed Oct. 28, 1998.

The present invention relates to a composite, particulate feed for fry or larvae of other marine organisms. Also, the invention relates to a method of manufacturing this feed.

One of the reasons why the rearing of salmon has become a national and international successful industry today, is, among others things, that this species can easily be fed a Starting feed. The fact that start-feeding and cultivation at the larvae stage are mastered, also appliers to all other species which have had a breakthrough in commercial aqua culture (Watanabe & Kiron 1994). Contrary to salmon, which is start fed with formulated feed, most other relevant reared species are fed live feed as starting feed. This applies to species like the sea bass (*Dicentrarchus labrax*), gilthead sea bream (*Sparus aurata*), turbot (*Scophtalmus maximus*), sole (Solea sp.), cod (*Gadus morhua L.*) and Atlantic halibut (*Hippoglossus hippoglossus*) (Person Le Ruyet et al., 1993). Wolffish (*Anarhichas lupus*) is a marine species which, can easily start fed with formulated feed (Moksness et al. 1989, Strand et al. 1995). A freshwater species like carp (*Cyprinus carpio*) can also be start-fed with formulated feed. However, in intensive farming it is also recommended for this species to be fed live prey (Kamler 1992) as starting feed. Rotatories and Artemia are the types of live feed which are used the most in intensive rearing systems (Naas et al 1992, Watanabe & Kiron 1994). To obtain the desired nutritional composition, these types are enriched with nutrients before they are offered as feed to the fry/larvae of fish. In semi-intensive systems collected natural animal plankton is used, and an addition of Artemia is used in periods when prey is scarce (van der Meeren & Næss 1993, Næss et al. 1995).

Dabrowski (1984) divides larvae of fish into three categories based on the development of the digestive channel. Group 1 is larvae which have a functional stomach at first feed (salmon and wolffish). These species can be start-fed with formulated feed. Group 2 is larvae which develop a stomach later in the ontogenesis (sea bass, gilthead sea bream, Atlantic halibut, turbot, sole and cod). Group 3 is fishes which do not develop a stomach (carp). The problems by feeding formulated feed as the starting feed is connected, first and foremost, to the groups 2 and 3.

A number of tests have been carried out on the ability of fish larvae of enzymatic digestion of feed taken in. (Hjelmeland et al. 1984, Lauff & Hofer 1984, Baragi & Lovell 1986, Pedersen et al 1990, Verreth et al. 1992). The fact that fish larvae which cannot be start-fed with formulated feed, do not have a stomach, has given reason to believe that they may have special requirements as to choice of feed, the digestion in their intestines and their ability to absorb across the intestinal wall. In the extension of this it has also been discussed whether, and to what extent, the fish larvae's digestion of the feed taken in, is dependent on enzymes in the live feed (Dabrowski & Glokowski 1977 a,b,c, Dabrowska et al 1979, Lauff & Hofer 1984, Léger et al 1986, Tandler & Kolkovski 1991).

To establish the nutritional requirements of the larvae on start-feeding, it has been suggested that analyses of the composition and consumption of the yolk body (endogen absorption of nourishment) may provide knowledge on this. This approach shows that marine fish eggs, as compared to grown fish, has a high content of n–3 fatty acids, phospholipids, free amino acids: and some vitamins and minerals. By means of such analyses, differences between species in the turnover of energy have been disclosed (RØnnestad et al. 1992, RØnnestad & al. 1994, RØnnestad & Fyhn, 1993). Based on the endogen absorption of nourishment larvae may be divided into larvae with a drop of oil in their yolk sacs and larvae without a drop of oil in their yolk sacs. Turbot, sole, sea bass and gilthead sea bream have an oil drop in their yolk sacs whereas cod and Atlantic halibut do not.

Analyses of the chemical composition of natural prey is another approach which has been applied to establish the nutritional requirements of larval fish. The main focus in this context has been on the high level of poly-unsaturated fatty acids, in particular EPA and DHA (20:5 n–3 and 22:6 n–3) (Sargent et al. 1989, van der Meeren et al. 1993), the high level of phospholipids in nauplii (Sargent et al. 1989) and the content of free aminoacids. (Fyhn 1989).

The nutritional requirements are conventionally studied by performing dose/response experiments, in which the contents of nutrients of the feed are being varied. Because of inadequate feed technology and lack of success, so far, in making the larvae survive on formulated feed, this approach has been possible only through enrichment of the prey. Present feed technology has not been able to provide a feed which allows control of what nutrients the larvae actually do receive. The problems are first and foremost associated with nourishment leaking out from such feed particles.

Internationally a considerable effort has been made to develop a formulated feed for the feeding of larval fish, but a formulated feed which results in just as good survival and growth as live feed from the first feed is yet to be developed (Watanabe & Kiron 1994). Generally, feed for larval fish is prone to water-soluble nutrients leaking out because of the small particle size (large surface relative to volume). The problem connected to the formulation of the starting feed has been to manufacture particles which are both stable in terms of leakage of water-soluble nutrients, and easily digestible to the larva. Without encapsulation (stabilisation of the surface) of the feed, 30–50% of the dry weight are wasted (Urban-Jezierska et al. 1984, Kamler 1992). This loss is represented by "fine dust" (<20 $\mu$m) and leakage of essential water-soluble components (amino acids, peptides, proteins, vitamins, minerals). A number of methods of micro-encapsulation of starting feed for larval fish has been developed (Teshima et al. 1982). This helps stabilise the particle, but common for all the methods is that the water-soluble components leak out of the feed particle after feeding. An instant loss of up to 80% of leakable material ($OD_{280}$, i.e. amino acids, peptides, proteins) has been observed in particles between 100–300 $\mu$m (Garatun-TjeldsteØ 1993). If the particles are made too stable (tight), they will also be indigestible to the larval fish.

Today it is commonly agreed among people of the trade as well as researchers that future rearing of fish on an industrial scale assumes the possibility of being able to use formulated feed as early as possible, preferably from the start. This is because there are several factors of uncertainty attached to the live feed technology. Those are factors associated with the risk of transferring diseases, variable nutritional composition, variable supply of prey through the year, competence connected to the cultivation of prey and costs. The lack of adequately formulated feed, for larvae as a substitute for live feed is a substantial hindrance for the development of a trade of fish farming based on marine species of fish. Accordingly, the trade policy forms the very best basis for increased efforts in the developing and manufacturing of formulated feeds for larval fish.

To control leaks from micro-particulate feed, there has been developed, according to the present invention, a technology based on the use of a cross-linking matrix and phospholipids/biomembranes in the feed. The development of the technology has been based on the considerations that a feed particle for the feeding of larval fish should be given a number of positive qualities, characteristic of an optimal feed organism. It should have:

1. The ability to stay afloat in the water column for a longer time without dissolving.
2. A size, taste and looks that make the want to eat
3. Balanced contents of nutrients.
4. A reduced/controlled leak to the water, so that the nutritional value is not reduced.
5. A controlled leak to the water so that the tastiness of the feed is increased.
6. A high digestibility after intake into the intestine of the fish.

The formulated feed particles developed to solve the problems mentioned above, are characterized, according to the characterizing part of claim 1, by the feed particles consisting of a matrix containing preferably water-insoluble nutrients, the particles having, embedded therein, phospholipids/biomembranes, the biomembranes containing fat-soluble components and packing preferably water-soluble nutrients.

This may be explained in depth in the items 1–11 below:
1. The water-soluble nutritional components of the feed, and any water-soluble additives, are prevented from leaking out by being present encapsulated in phospholipids/biomembranes in the particles.
2. The production of biomembranes in the feed may be carried out according to the European patent document No. 0 158 441 B1.
3. The biomembranes, which are formed of phospholipids, and are a nutrient in themselves, dissolve rapidly in the intestine and release their content.
4. Dependent on their source, the phospholipids may contain marine fatty acids which are essential nutrients for the fish.
5. The particle is produced by the embedding of the phospholipids with water-soluble substances together with other nutrients in a matrix.
6. Water-soluble substances packed in the particle by means of phospholipids to increase the tastiness, are hydrolysed proteins.
7. The size of the particles of wet feed is determined in the manufacturing of the matrix (atomisation).
8. The size of the particles of dry feed are determined in the grinding and sifting.
9. Most of the nutrients of the feed are present as water-insoluble material in the matrix.
10. The technology for cross-linking the feed ensures a low rate of sedimentation of wet feed.
11. The technology for cross-linking the feed and subsequently freeze-drying it, ensures a low rate of sedimentation of the dry feed.

A method of manufacturing this feed for the larvae of fish or other organisms in the sea and in freshwater, excels primarily by the fact that a matrix which contains water-insoluble nutrients, phospholipids/biomembranes containing fat-soluble and water-soluble nutrients, further nutrients and water, is mixed together, is comminuted in a nozzle or similar under the supply of gas and then cross-linking in a suitable solution.

Properties of the feed particles and their production and examples of the application of the particles of the feed according to the invention, will be described in the following, with reference to the accompanying drawings, in which.

Figure 1:
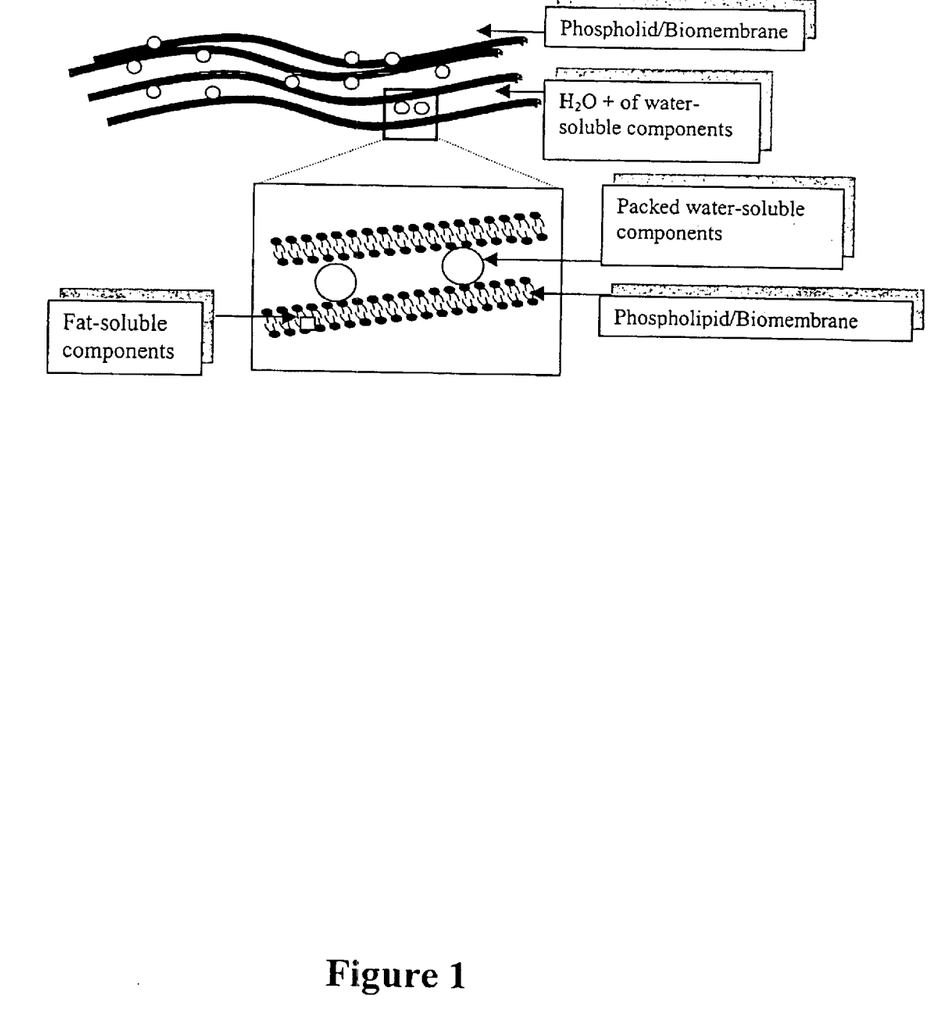
FIG. 1 shows a schematic drawing of a phospholipid/biomembrane with encapsulated, water-soluble nutrients.

In FIG. 1 is shown schematically the packing in the feed particles of the water-soluble components of the phospholipid fraction of the feed. Open circles indicate water-soluble components encapsulated in the phospholipid/biomembranes. There is also shown a section of the phospholipid/biomembrane with its hydrophilic (filled circles) and hydrophobic parts. Open rectangle indicates incorporated fat-soluble components of the phospholipid membrane. The water-soluble fractions of the feed, which it is desirable to keep after the feeding, are packed into the phospholipids by mixing the latter with an aqueous solution of the water-soluble fractions. This may be solutions of hydrolysed proteins as attractants (peptides/amino acids), bioactive proteins/peptides (enzymes, probiotics), bioactive carbohydrates (probiotics), water-soluble vitamins and minerals. Fat-soluble components may be dissolved in the phospholipid membranes. They may be modified water-soluble vitamins, fat-soluble vitamins, antioxidants and substances for stabilising/reducing the leakage through the phospholipid membranes (e.g. cholesterol). The types of fatty acids in the phospholipids depend on the source. Marine phospholipids are rich in the essential fatty acids EPA (20:5, n–3) and DHA (22:6, n–3), and the phospholipids may therefore be a source of these fatty acids to the fish. In phospholipids of cod roe, about 50%, for example, of the fatty acids, EPA/DHA are in a ratio 1:2. The ratio of phospholipids and packed hydrolysed proteins may vary between 100:1 and 1:2, most typically 2:1. The ratio of phospholipids and bioactive proteins/peptides may vary between 100:1 and 1:2, most typically 10:1. The ratio of phospholipids and fat-soluble components of the phospholipid membrane may be between $1*10^6:1$ and 2:1.

TABLE 1

| | |
|---|---|
| a. Alginate | 2% |
| b. Fish muscle hydrolysate | 5% |
| c. Other water-soluble substances | |
| d. Phospholipids | 10% |

TABLE 1-continued

| | |
|---|---|
| e. Fat-soluble substances | |
| f. Cod roe powder | 41,5% |
| g. Cod muscle powder | 41,5% |

In the above Table 1 is shown the composition of raw materials of an experimental feed as an example of the composition of the feed. 1) The matrix material (a. in the table) (e.g. alginate) is dissolved in water. 2) Then the nutrients of the feed, which are not water-soluble (f. and g. in the table), are mixed with this solution. 3) The solution of phospholipids (d. and e. of the table) with the packed water-soluble elements (b. and c. in the table) are mixed with this solution. The ratio of phospholipid and other nutrients of the feed may be between 1:100 and 1:3, most typically 1:10. The ratio of the matrix material and other nutrients of the feed may be between 1:200 and 1:10, most typically 1:50.

Figure 2:
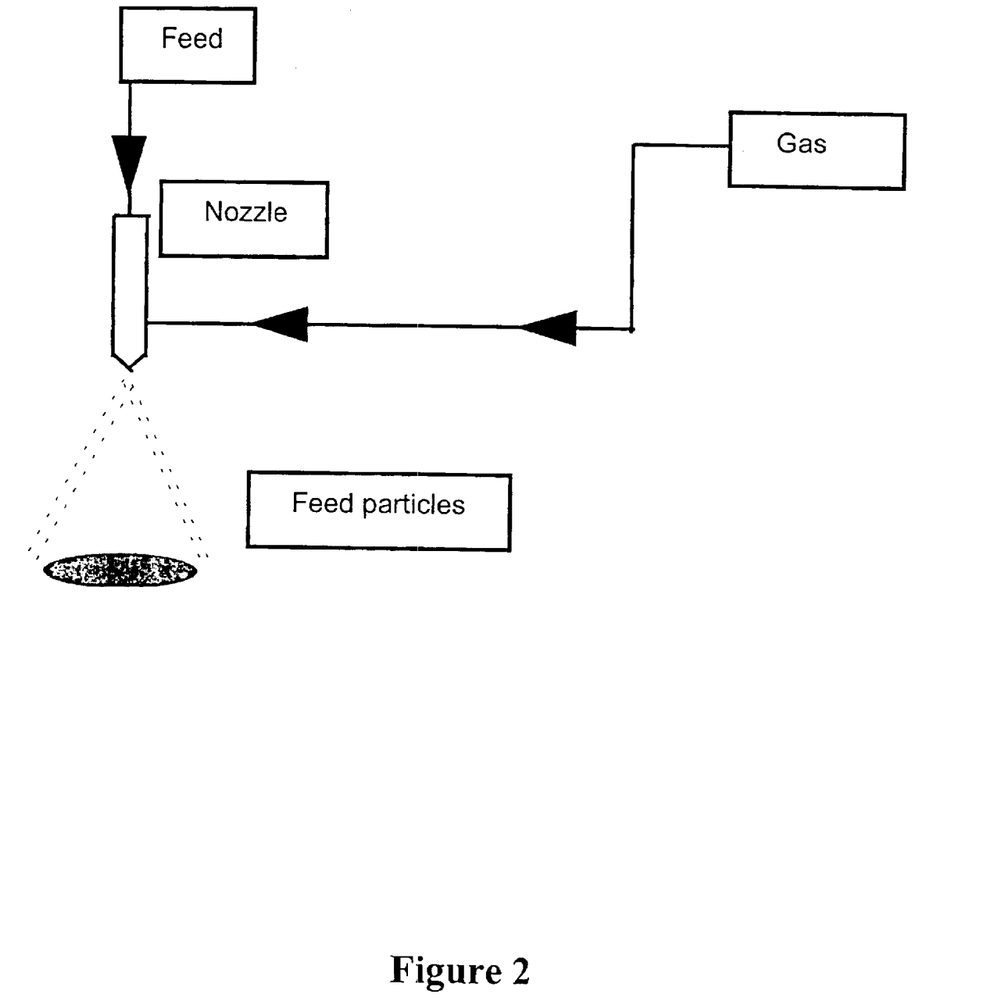
FIG. 2 illustrates in general the method of manufacturing the feed particles.

In FIG. 2 is schematically shown the process of manufacturing feed particles. By the use of alginate in the matrix material, it cross-links after particle propagation in a solution of divalent ions, most typically a $CaCl_2$ solution or directly in sea water. The size of the particles may be determined by means of atomisation and nozzle size in this process. When manufacturing dry feed, the feed may be crushed later and sifted into the desired size fractions. The strength of a $CaCl_2$ solution for the cross-linking of the alginate matrix is between 0,5 M and 0,05 M, most typically 0,2 M.

TABLE 2

| | Cross-linked in $CaCl_2$ | | | Cross-linked in sea water | | |
|---|---|---|---|---|---|---|
| | 258M[3] | 258N[3] | 258K[3] | 258 M | 258 N | 258 K |
| 5 min ($OD_{280}$) | 1.753 | 1.790 | 1.774 | 1.243 | 0.777 | 0.878 |
| 15 min ($OD_{280}$) | 2.260 | 2.380 | 2.496 | 2.940 | 2.064 | 2.520 |
| Packed FMH[1] (mg) | 286 | 248 | 212 | 72 | 348 | 204 |
| Rate of packing[2] (%) (15 min) | 57 | 50 | 42 | 14 | 70 | 41 |

[1]FMH = fish muscle hydrolysate
[2]Packed FMH relative to phospholipid
[3]Different fractions of phospholipid In the above Table 2 is shown leakage from particles of cross-linking, in $CaCl_2$ and in sea water. The leakage is shown comparatively of different fractions of phospholipids from soya bean. It appears from the table that different fractions of phospholipid have different properties in terms of leakages of packed water-soluble protein hydrolysate.

TABLE 3

| | Cross-linked in $CaCl_2$ | | | Cross-linked in sea water | | |
|---|---|---|---|---|---|---|
| | 258 M[3] | 258 N[3] | 258 K[3] | 258 M | 258 N | 258 K |
| 5 min ($OD_{280}$) | 0.522 | 0.682 | 0.737 | 0.217 | 0.550 | 0.549 |
| 15 min ($OD_{280}$) | 0.857 | 1.106 | 1.276 | 0.309 | 0.832 | 0.819 |
| 60 min ($OD_{280}$) | 1.040 | 1.416 | 1.632 | 0.356 | 0.989 | 0.967 |
| Packed FMH[1] (mg) | 204 | 136 | 83 | 44 | 270 | 128 |

TABLE 3-continued

| | Cross-linked in $CaCl_2$ | | | Cross-linked in sea water | | |
|---|---|---|---|---|---|---|
| | 258 M[3] | 258 N[3] | 258 K[3] | 258 M | 258 N | 258 K |
| Rate of packing[2] (%) (15 min) | 40 | 27 | 17 | 9 | 54 | 26 |

[1]FMH = fish muscle hydrolysate
[2]Packed FMH relative to phospholipid
[3]Different fractions of phospholipid In the above Table 3 is shown leakage from freeze-dried particles after rehydration (feeding) in sea water. Here too, the leakage is shown comparatively between particles of different fractions of phospholipid. After freeze-drying the feed there are also considerable variations between the leakage properties of water-soluble protein hydrolysate of the different fractions.

Figure 3:
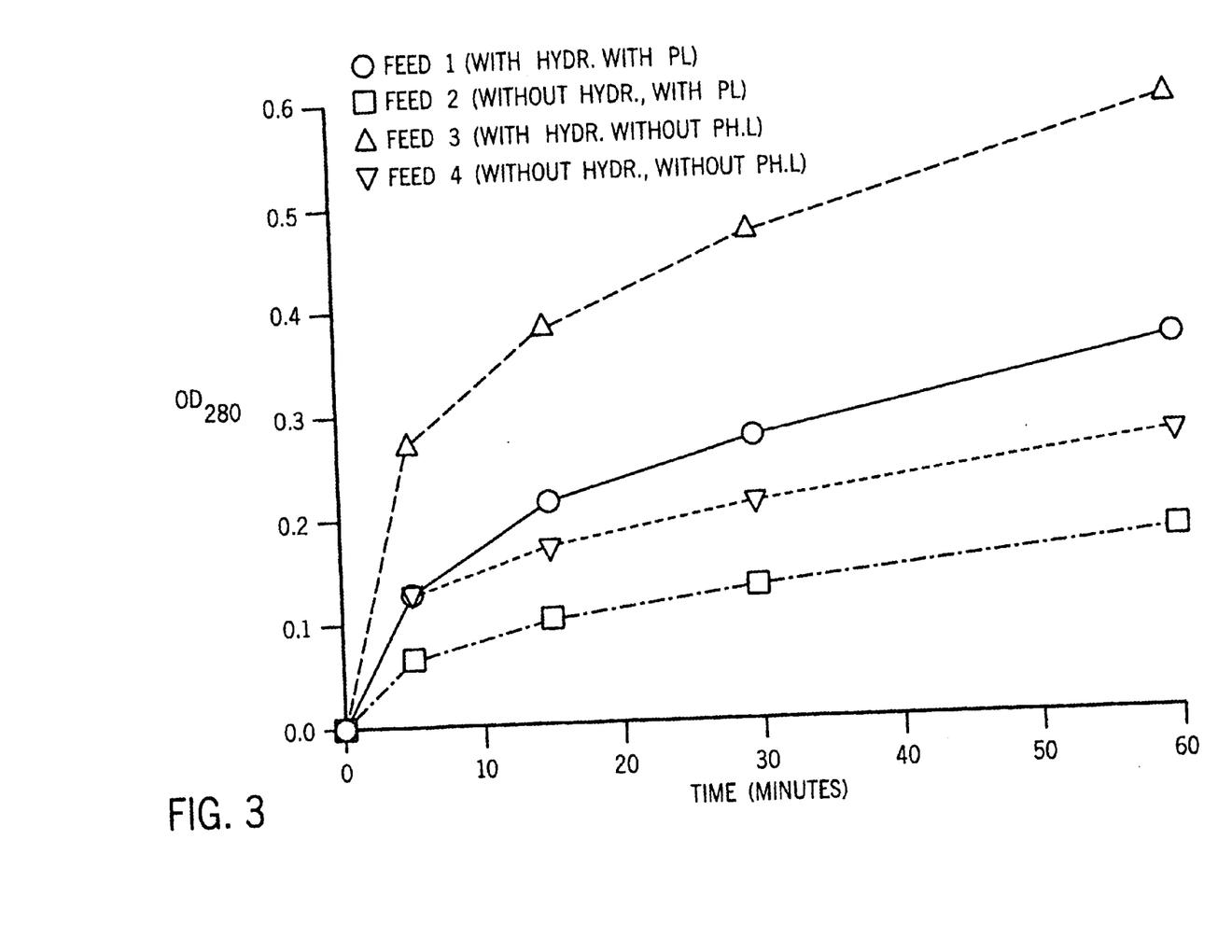
FIG. 3 shows leakage from feed particles with and without the use of phospholipids.

In FIG. 3 is shown comparative leakage from different feeds produced as $OD_{280}$ with time. Feeds 1 and 2 are both feeds with phospholipid added to prevent leaking. Feed 1 has hydrolysed protein packed into the phospholipids, whereas feed 2 has no addition of hydrolysed protein. Feeds 3 and 4 are both without added phospholipid. Feed 3 has an addition of hydrolysed protein, whereas feed 4 has no addition of hydrolysed protein. From the figure it can be seen that the phospholipids reduce the leak from the particles. The leaks from feeds 2 and 4 represent the leaks of water-soluble protein of the particulate protein of the particle matrix.

Figure 4:
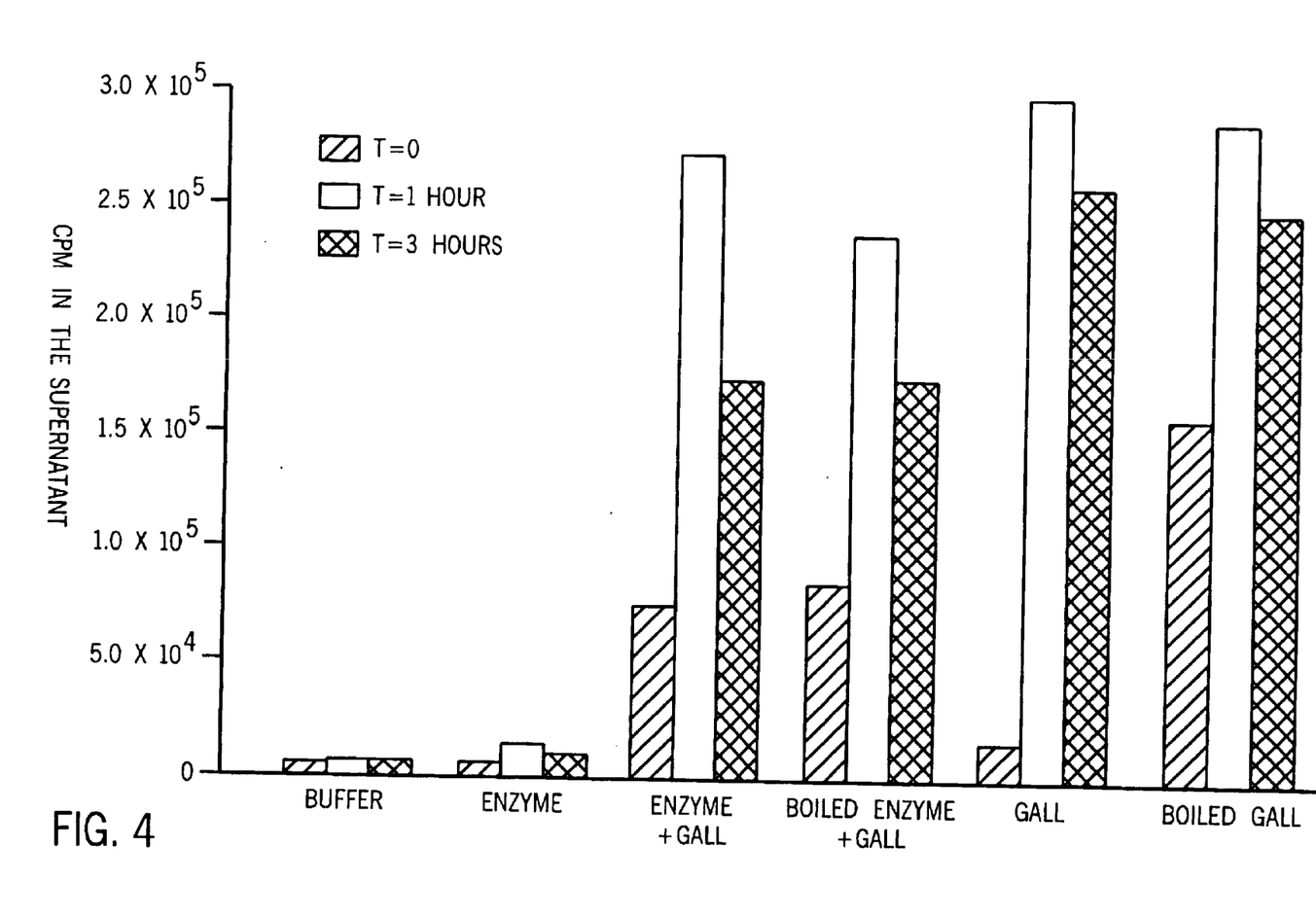
FIG. 4 shows in vitro digestion of the feed.

In FIG. 4 is shown in vitro digestion of the feed. It appears from the figure that it is the detergent effect of the gall salts that destabilises the phospholipids and releases the packed nutrients, in this case $^{125}$I-BSA. The release of packed, marked protein was measured as recovered cpm (counts per minute) in the supernatant.

Figure 5:
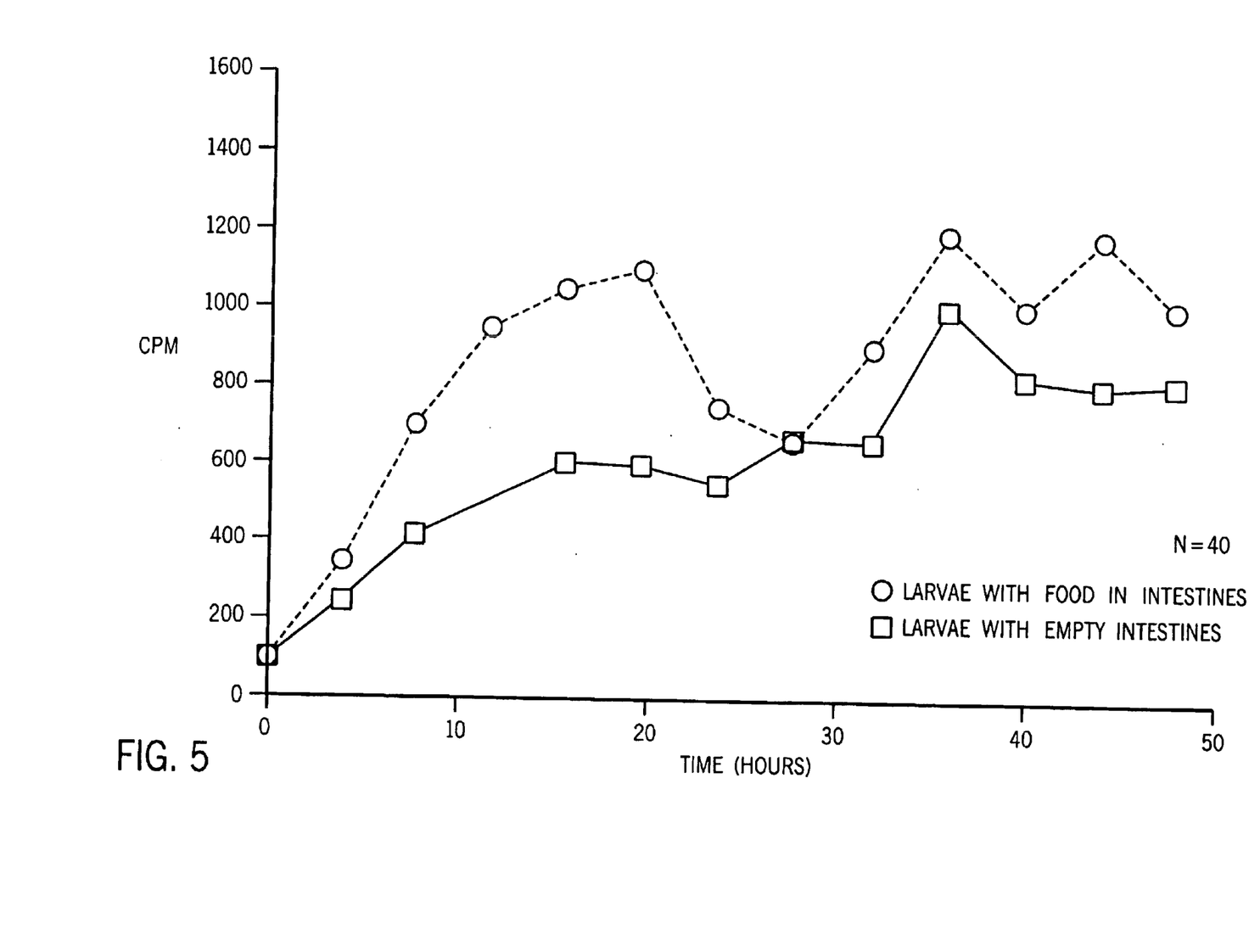
FIG. 5 shows in vivo digestion of the feed.

In FIG. 5 is shown in vivo digestion of a feed fed to cod larvae (particle size=100 µm). Since larval cod are so small (dry weight=40 µg, length=4 mm), the absorbed amount of feed is stated as cpm in empty larvae, i.e. the radio activity found in fish with an empty intestine is interpreted as digested and absorbed across the intestine. Corresponding experiments have been done for salmon (100 g) and cod (10 g), and high count figures have been found both in muscle, blood and organs (spleen and kidney). The results from in vitro and in vivo experiments therefore show that fish is capable of releasing and utilising nutrients packed in phospholipid membranes.

Figure 6:
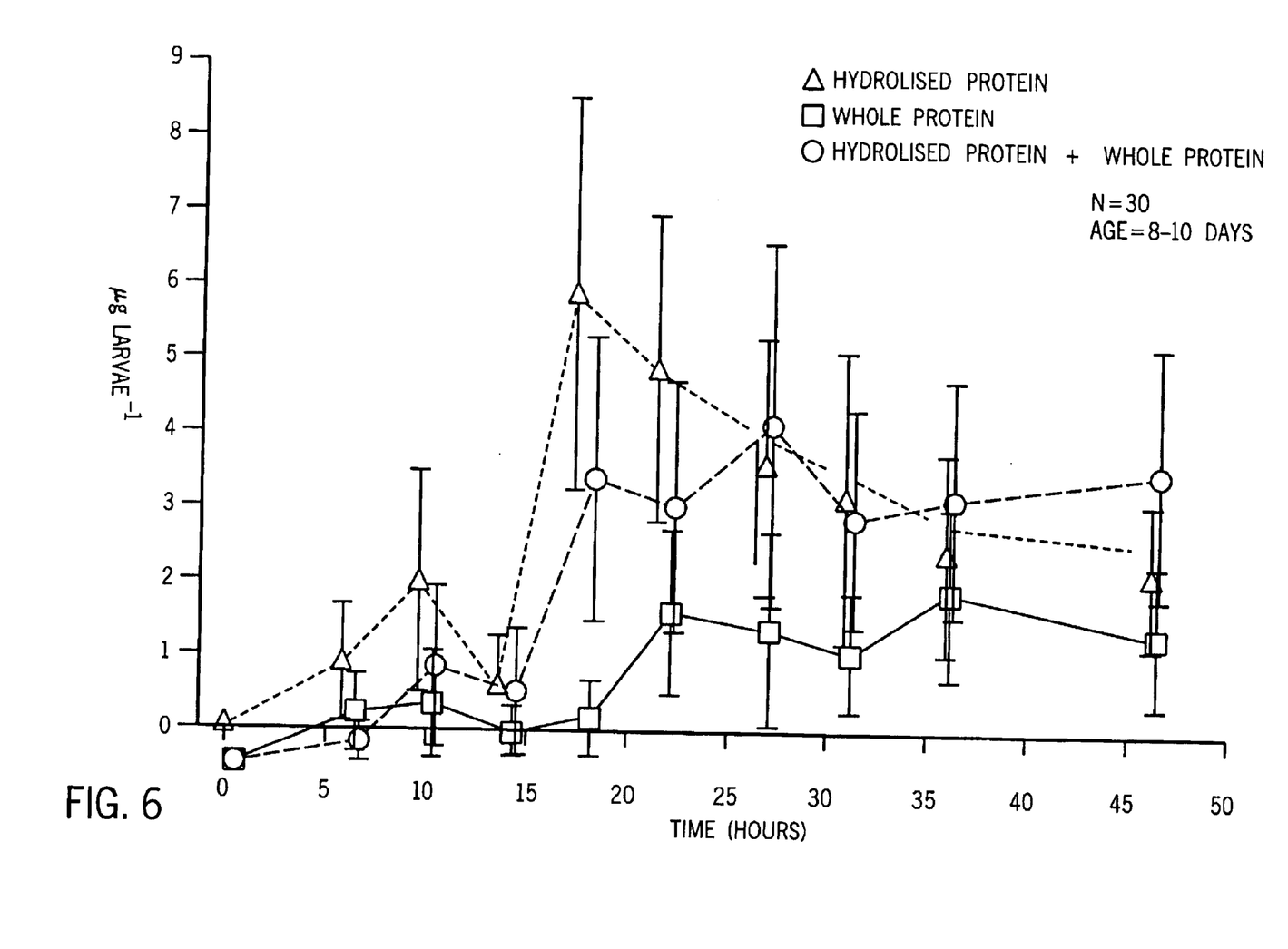
FIG. 6 shows comparative studies of the intake feed with packed hydrolysed protein, and of feed without hydrolysed protein added.

In FIG. 6 is shown comparative intakes of feed with and without packed hydrolysed protein. The experiment was carried out on larval cod from day 8 to 10 after hatching. The mean particle size of the feed was 100 µm. Small. (3 µm) plastic balls marked with $^{125}$I were used as indigestible markers for the intake of feed. All feeds contained phospholipid, two feeds had packed hydrolysed protein (hydrolysed protein and hydrolysed protein+wholeprotein in the figure) and one had no addition of hydrolysed protein (wholeprotein in the figure). This experiment clearly showed the attractant effect, of the packed hydrolysed protein. Comparative growth experiments have also been carried out for feed with and without packed hydrolysed protein. Feed with packed hydrolysed protein resulted in greater growth than feed without packed hydrolysed protein.

Figure 7:
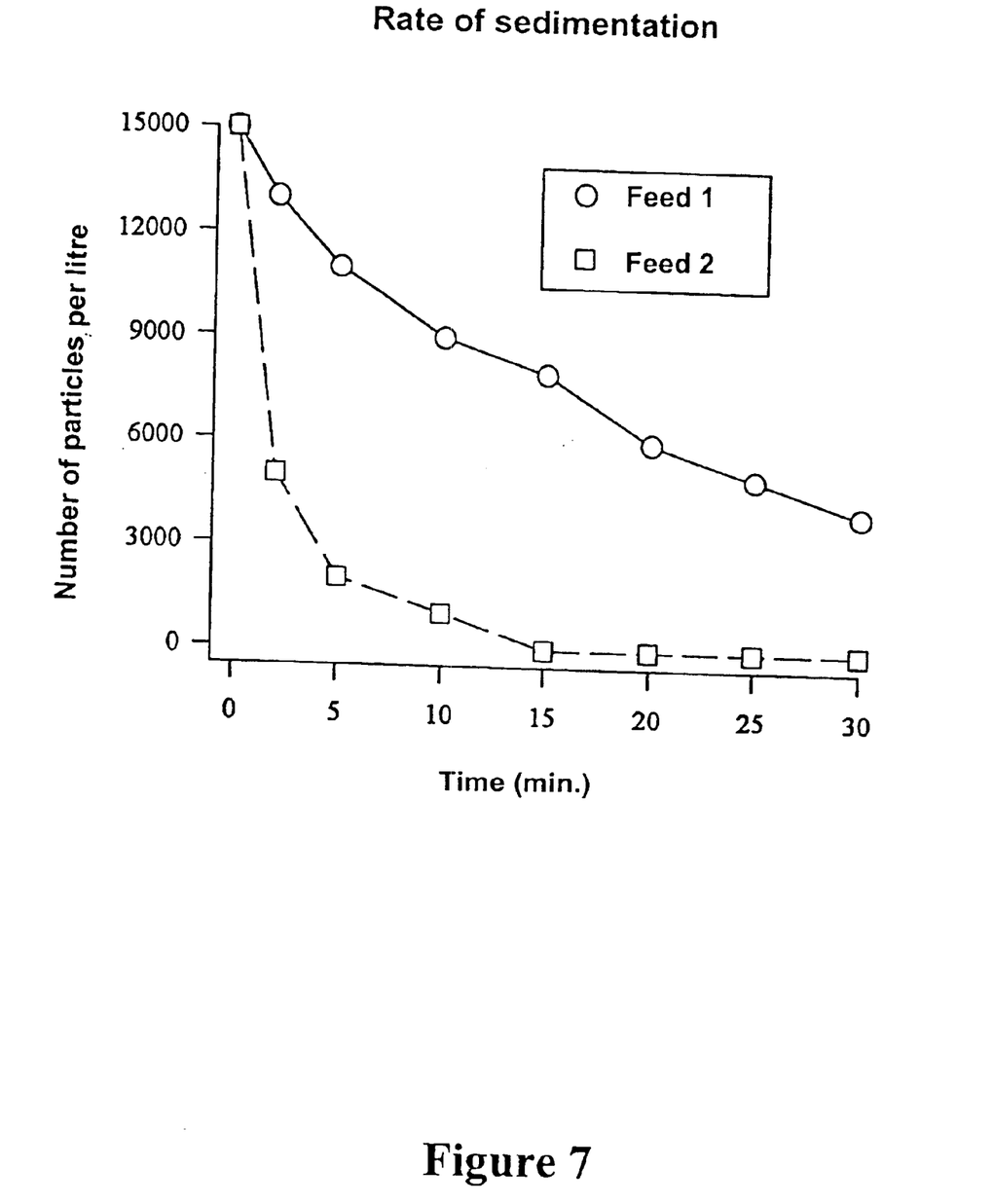
FIG. 7 shows the rate of sedimentation of the feed in comparison with another feed in a rearing system.

In FIG. 7 the rate of sedimentation is shown comparatively for two feeds of a particle size of 250 µm<d<315 µm.

Feed 1 is a feed made according to the specification given herein above. The feed that it is compared with, is a granulate feed (NorAqua AS). It appears from the figure that feed 1 stays in the water column longer than feed 2. The experiment was carried out in small vessels(40 litres) with a slight upward current, corresponding to what is used in start-feeding experiments on larval fish.

Figure 8:
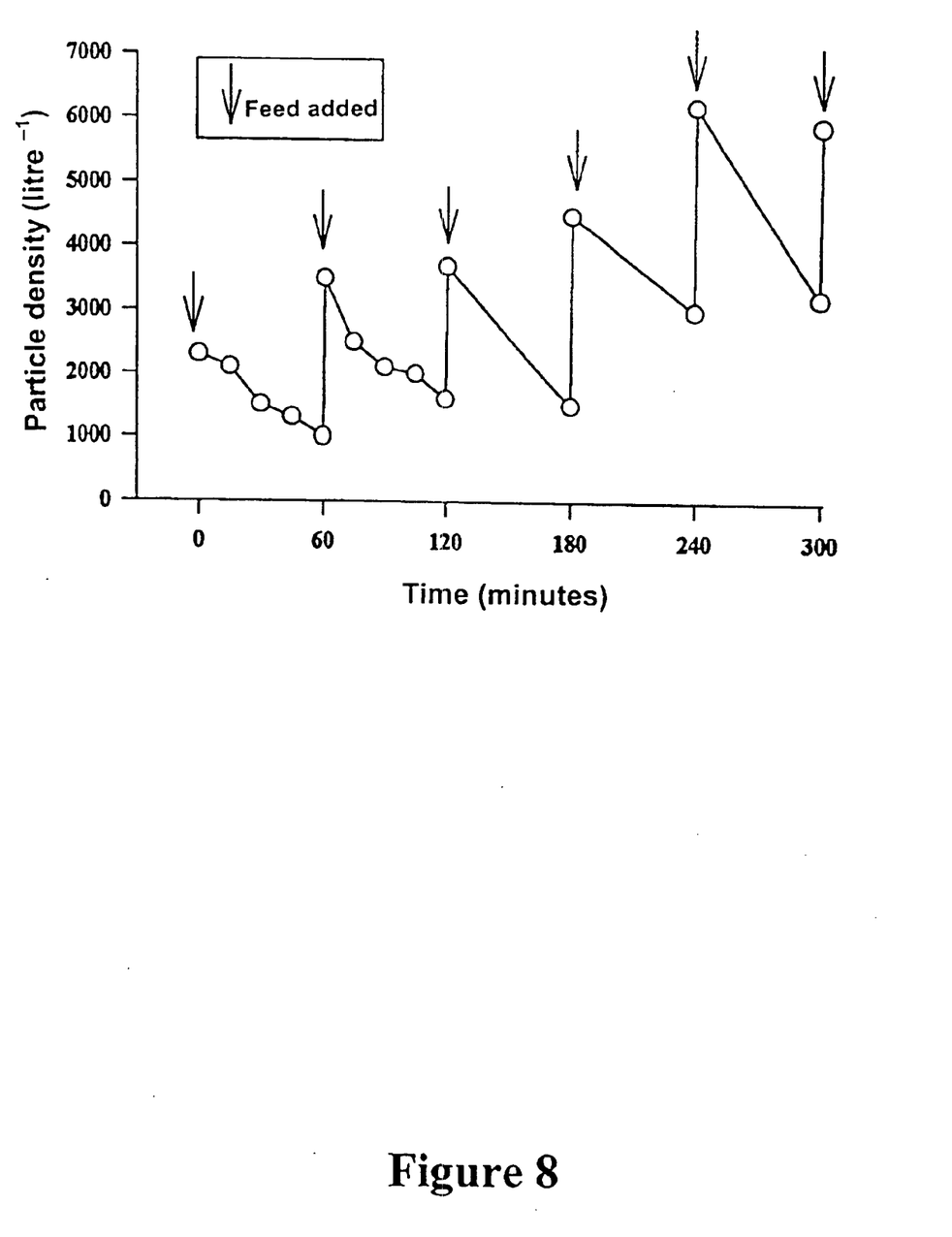
FIG. 8 shows the rate of sedimentation of the feed in a rearing system.

In FIG. 8 is shown the rate of sedimentation of feed 1 (mentioned above) in a rearing vessel of 6000 litres, with a particle size of 125 $\mu m < d < 180$ $\mu m$. The water in the vessel was placed under current corresponding to that used by the start-feeding of larval fish. It is desirable to maintain a particle density of 2000–3000 particles per litre to have optimum pasturing conditions. In this experiment there were added 10 g of dry feed every hour. There was no fish in the system, so that there was no pasturing on the feed. It is seen that the optimum feed density can be maintained in the vessel. By adding feed at shorter time intervals, a more stable particle density in the vessel can be achieved. In the same vessel and with feeding with Artemia, 125 g of Artemia is spent per day for 10 000 fish. Feeding 10 g of formulated feed per hour, will make 240 g per day. The feed technology mentioned therefore ensures that the feed has such a specific gravity and rate of sedimentation that it can compete with live feed. These ate important factors for the economy and the environment/contamination within the vessel. Besides, it is important that the feed settles after a while, so that feed of an inferior quality will be removed from the vessel because of leakage, and will not be offered to the fish. It is a problem that live prey is more difficult to remove from the vessel, so that after being enriched, it will remain too long in the vessel and lose its quality as a feed. When the fish pastures on formulated feed, the density of feed in the vessel may in a very simple manner be controlled through the amount supplied per feeding and by the time intervals between the feedings.

References

Baragi, V. Lovell, R. T. (1986): Digestive enzyme activities in striped bass from first feeding through larva development. Trans.American Fish.Soc., 115: 478–484

Dabrowska, H., Grudniewski, C., Dabrowski, K. (1979): Artificial Diets for Common Carp: Effect of the Addition of Enzyme Extracts. Prog.Fish-Cult., 41: 196–200

Dabrowski, K. (1984): The feeding of fish larvae: present <<state of art>> and perspectives. Reprod.Nutr.Dévelop. 24: 807–833

Dabrowski, K., Glogowski, J. (1977a): Studies on the proteolytic enzymes of invertebrates constituting fish food. Hydrobiologia, 52: 171–174

Dabrowski, K., Glogowski, J. (1977b): The role of exogenic proteolytic enzymes in digestion processes in fish. Hydrobiologia, 54: 129–134

Dabrowski, K., Glogowski, J. (1977c): A study of the application of proteolytic enzymes to fish food. Aquaculture, 12: 349–360

Fyhn, H. J. (1989): First feeding of marine larvae: are free amino acids the source of energy? Aquaculture, 80: 111–120

Garatun-Tieldstø, O. (1993). Våtfôr til start og tilvenning av marine fiskelarver. Sluttrapport: NFFR V108.016/ 1501.125.001.

Hjelmeland, K., Huse, I. Jørgensen, T., Molvik, G. and Raa, J. (1984). Trypsin and trypsinogen as indices of growth and survival potential of cod (*Gadus morhua L.*) larvae. In: Dahl, E., Danielssen, D. S., Moksness, E. and Solemdal, P. (eds.), The propagation of cod *Gadus morhua L.* Flødevigen rapport-ser.1. pp. 189–202.

Kamler,E. (1992). Early Life History of Fish: An energetics approach. Chapman & Hall fish and fisheries series;4.

Lauff, M., Hofer, R. (1984): Proteolytic enzymes in fish development and the importance of dietary enzymes. Aquaculture, 37: 335–346

Léger, P., Bengtson, D. A., Simpson, K. L., Sorgeloos, P. (1986): The use and nutritional value of Artemia as a food source. Oceanogr.Mar.Biol.Ann.Rev., 24: 521–623

Moksness, E., Gjøsæther, J., Reinert, A., Fjallstein, I. s. (1989): Start-feeding and on-growing of wolffish (*Anrarhichas lupus*) in the laboratory. Aguaculture, 77: 221–228

Naas, K. E., Næss, T., Harboe, T. (1992): Enhanced first feeding of halibut larvae (*Hippoglossus hippoglossus L.*) in green water. Aguaculture, 15: 143–156

Næss,.T., Germain-Henry, M., Naas, K. E. (1995): First feeding of Atlantic halibut (*Hippoglossus hippoglossus*) using different combinations of Artemia and wild zooplankton. Aguaculture, 130: 235–250

Pedersen, B. H., Ugelstad, I., Hjelmeland, K. (1990): Effects of a transitory, low food supply in the early life of larval herring (*Clupea harengus*) on mortality, growth and digestive capacity. Mar.Biol., 107: 61–66

Person Le Ruyet, J., Alexandre, J. C., Thebaud, L., Mugnier, C. (1993): Marine Fish Larvae Feeding: Formulated Diets or Live Prey? J.World Aquac.Soc. 24:

Rønnestad, I., Fyhn, H. J. (1993): Metabolic aspects of free amino acids in developing marine fish eggs and larvae. Rev.Fish.Sci., 1: 239–259

Rønnestad, I., Fyhn, H. J., Gravningen, K. (1992): The importance of free amino acids to the energy metabolism of eggs and larvae of turbot (*Scophthalmus maximus*). Mar.Biol. 114: 517–525

Rønnestad, I., Koven, W. M., Tandler, A., Harel, M., Fyhn, H. J. (1994): Energy metabolism during development of eggs and larvae of gilthead sea bream (*Sparus aurata*). Mar.Biol., 120: 187–196

Sargent, J., Henderson, R. J., Tocher, D. R. (1989): The Lipids. In: Halver, J. E. (Ed.), Fish Nutrition. Academic Press Inc. Pp. 154–209

Strand, H. K., Hansen, T. K. Pedersen, A., Falk_Pettersen, I. B. and Øiestad, V. (1995). First feeding of common wolffish on formulated dry feed in a low water-level raceway system. Aguaculture International 3: 1–10.

Tandler, A., Kolkovsky, S. (1991): Rates of ingestion and digestibility as limiting factors in the successful use of microdiets in sparus aurata larval rearing. European Aquac.Soc., 15: 169–171

Teshima, S. I., Kanazawa, A.; Sakamoto, M. (1982). Microparticulate diets for the larvae of aquatic animals. Min. .Rev.Data File Fish.Res. 2: 67–86

Urban-Jezierska, E., Kamler, E., Barska; B. (1984),: Dry matter and nitrogen compounds leached from six carp starters. Pol.Arch.Hydrobiol. 31: 119–134 van der Meeren, T., Klungsøyr, J., Wilhelrasen, S., Kvenseth, P. G. (1993): Fatty acid composition of unfed cod larvae *Gadus morhua L* and cod larvae feeding on natural plankton in large enclosures. J.World Aquac.Soc. 24: 167–185 van der Meeren, T., Næss, T. (1993): How does cod (*Gadus morhua*) cope with variability in feeding conditions during early larval stages? Mar.Biol. 116: 637–647

Verreth, J. A., Torreele, E., Spazier, E., van der Sluiszen, A., Rombout, J. H. W. M., Booms, R. (1992): The development of a functional digestive system in the African Catfish *Clarias gariepinus* (Burchell). J.World.Aguac- .Soc. 23: 28.6–298

Watanabe, T., Kiron, V. (1994): Prospects in larval fish dietetics. Aquaculture, 124: 223–227.

What is claimed is:

1. A composite, particulate feed suitable for use in the pasturing of aquatic organisms, in which feed leakage of water soluble nutrients from the feed is reduced, said feed comprising:

phospholipids/biomembranes containing added fat soluble components and having water soluble nutrients encapsulated therein, said phospholipids/biomembranes being embedded in a matrix containing water insoluble nutrients and cross-linking matrix material, whereby leakage of the water soluble nutrients from said feed is reduced.

2. A feed according to claim 1, characterized in that the water-soluble nutrients/encapsulated in the phospholipids/biomembranes comprise proteins, hydrolyzed proteins, amino acids, biactive proteins/peptides, bioactive carbohydrates, vitamins and minerals.

3. A feed according to claim 1, characterized in that the fat-soluble components added to the phospholipids/biomembranes comprises vitamins, antioxidants and substances that stabilize the biomembranes and thereby reduce the leakage therefrom.

4. A method of pasturing aquatic organisms comprising the step of feeding the aquatic organisms a composite particulate feed according to claim 1.

5. A method of manufacturing a composite, particulate feed for use in pasturing aquatic organisms, said method comprising the steps of:

mixing phospholipids/biomembranes containing added fat soluble components with water soluble nutrients to create a mixture;

mixing said mixture with an aqueous solution of a cross-linking matrix material and water insoluble nutrients;

cross-linking the matrix material containing the mixture in a suitable solution to provide a feed having enhanced properties with respect to reduced water soluble nutrient leakage and/or a low rater of sedimentation.

6. A method according to claim 5, characterized in that the feed is subjected to freeze-drying to ensure that after the drying, the feed will exhibit a reduced tendency of leaking when phospholipids are used.

7. A method according to claim 5, characterized in that after the feed has been subjected to cross-linking, the feed is subjected to freeze-drying to ensure ensuring a low rate of sedimentation.

8. A method of manufacturing a composite, particulate feed for use in the pasturing of aquatic organisms, leakage of water soluble nutrients from the feed being reduced, said method comprising the steps of:

providing phospholipids/biomembranes;

adding fat soluble components to the phospholipids/biomembranes;

mixing the phospholipids/biomembranes with an aqueous solution of water soluble nutrients, the leakage of which is to be reduced, to create a mixture;

providing a cross-linking matrix material;

adding water insoluble nutrients to the matrix material; and mixing said mixture with an aqueous solution of the cross-linking matrix material and water insoluble nutrients.

9. A method according to claim 8 further including the step of comminuting the matrix material containing the mixture.

10. A method according to claim 9 wherein the matrix material containing the mixture is comminuted in a nozzle supplied with gas.

11. A method according to claim 9 including the further step of cross-linking the commuted matrix material in a suitable solution.

12. A method according to claim 11 further including the step of drying the feed.

* * * * *